United States Patent
Park

(10) Patent No.: US 6,594,359 B1
(45) Date of Patent: Jul. 15, 2003

(54) CIRCUIT FOR ELIMINATING ECHO AND SIDE TONES IN A SWITCHING SYSTEM

(75) Inventor: Jae-Min Park, Namyangju-shi (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 0 days.

(21) Appl. No.: 09/461,027

(22) Filed: Dec. 15, 1999

(30) Foreign Application Priority Data

Dec. 23, 1998 (KR) .......................................... 1998-57856

(51) Int. Cl.[7] .............................. H04M 1/00; H04B 3/20
(52) U.S. Cl. ............. 379/391; 379/406.01; 379/406.08; 379/406.02; 370/286; 370/290
(58) Field of Search ................................. 370/286, 289, 370/290, 292; 379/406.01, 406.05, 406.06, 406.08, 406.1, 391, 392, 392.01, 390.02, 399.01, 413.02, 416, 417, 390.03, 394, 406.02

(56) References Cited

U.S. PATENT DOCUMENTS 3,699,271 A * 10/1972 Berkley et al. ............. 379/391
5,099,472 A    3/1992 Townsend et al.
5,177,785 A * 1/1993 Itani et al. ...................... 380/6
5,576,713 A * 11/1996 Suzuki et al. ............... 379/391
6,182,032 B1 * 1/2001 Rapeli ......................... 704/214
6,477,250 B1 * 11/2002 Sheets ........................ 379/404

* cited by examiner

Primary Examiner—Rexford Barnie
(74) Attorney, Agent, or Firm—Robert E. Bushnell, Esq.

(57) ABSTRACT

A circuit able to attenuate echo and side tones in a switching system connecting the first and second subscribers, comprises a first linear converter for converting pulse code modulated data generated by the first subscriber into an analog signal in the read message mode of the time switch, a side tone canceling filter for eliminating the side tones from the analog signal produced by the first linear converter, a clipper for clipping the analog signal rid of the side tones, a first PCM converter for converting the output signal of the clipper into a refined PCM data written into the time switch in the write message mode of the time switch and transferred to the second subscriber, a second linear converter for converting the PCM data generated by the second subscriber into an analog signal, an echo canceling filter for eliminating the echo from the analog signal produced by the second linear converter, and a second PCM converter for converting the analog signal rid of the echo into a refined PCM data written into the time switch in the write message mode and transferred to the first subscriber.

20 Claims, 3 Drawing Sheets

CIRCUIT FOR ELIMINATING ECHO AND SIDE TONES IN A SWITCHING SYSTEM

CLAIM OF PRIORITY

This application makes reference to, incorporates the same herein, and claims all benefits accruing under 35 U.S.C §119 from an application entitled Circuit For Eliminating Echo And Side Tones In A Switching System earlier filed in the Korean Industrial Property Office on Dec. 23 1998, and there duly assigned Serial No. 98-57856 by that Office, a copy of which application is annexed hereto and simultaneously filed herewith.

BACKGROUND OF THE INVENTION

1. Field of the Invention

The present invention relates to switching processes and systems generally, and, more particularly, to processes and circuits for eliminating echo and side tones by employing a message mode of a time switch in a switching system.

2. Description of the Related Art

It has been my observation that the phenomenon of ringing echo that occurs in a hands-free telephone communication through an external speaker and microphone installed in a telephone is generally caused by the voice of the far end user being fed back from the speaker to the microphone. In addition, the side tone (or sidetone) phenomenon seems to usually be caused by the voice of a party induced to his own speaker when there is no impedance matching in the hybrid converting from two lines to four lines in a conventional telephone. Thus, if the echo and side tones are not properly eliminated during hands-free communication through a conventional telephone, the voice of one party is often mixed with that of the other party, degrading the communication quality. Hence, the conventional telephone should be provided with an additional circuit for eliminating such echo and side tones, resulting in an increase in production cost.

An example of one effort in the art to provide a system for echo cancellation and reduction of side tone is found in U.S. Pat. No. 5,099,472 to Bruce L. Townsend et al. entitled Hands Free Telecommunication Apparatus And Method, incorporated herein by reference.

SUMMARY OF THE INVENTION

It is an object of the present invention to provide an improved telephone switching process and system.

It is another object to provide a switching system with a circuit for eliminating the echo phenomenon occurring during hands-free communication through a telephone.

It is still another object of the present invention to provide a switching system with a circuit for eliminating the side tones occurring during hands-free communication through a telephone.

According to an aspect of the present invention, a circuit, for eliminating echo and side tones in a switching system connecting first and second subscribers, comprises a first linear converter for converting pulse code modulation (i.e., "PCM") data generated by the first subscriber into an analog signal in a read message mode of a time switch, a side tone canceling filter for eliminating the side tones from the analog signal produced by the first linear converter, a clipper for clipping the analog signal rid of the side tones, a first PCM converter for converting the output signal of the clipper into refined PCM data written into the time switch in a write message mode of the time switch and transferred to the second subscriber, a second linear converter for converting the PCM data generated by the second subscriber into an analog signal, an echo canceling filter for eliminating the echo from the analog signal produced by the second linear converter, and a second PCM converter for converting the analog signal rid of the echo into refined PCM data written into the time switch in the write message mode and transferred to the first subscriber.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
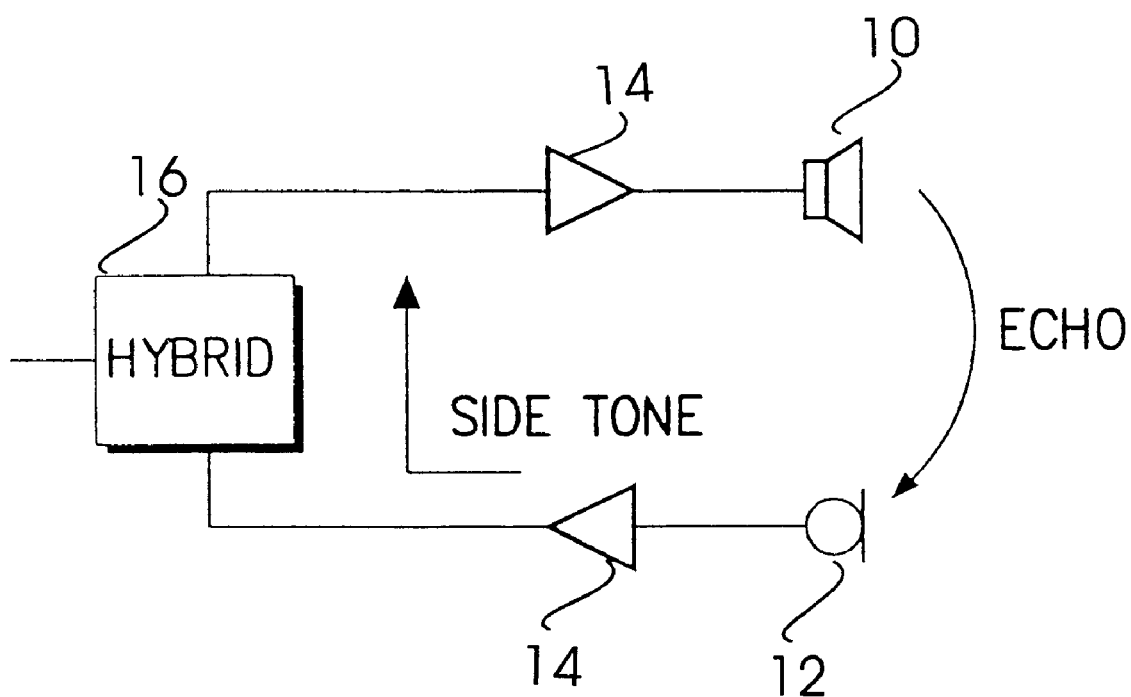
FIG. 1 is a block diagram for illustrating an echo and side tone phenomena occurring in a speaker telephone.

Turning now to the drawings, FIG. 1 illustrates one exemplar of a hands-free telephone providing communication through an external speaker 10 and microphone 12 that is installed in the telephone. I have noticed that the echoing phenomenon is a form of feedback that occurs in a hands-free telephone that is typically caused by amplification provided by the corresponding amplifiers 14 of the voice when the far end user is fed back from the speaker to the microphone. In addition, the side tone (or sidetone) phenomenon is usually caused by the voice of a party induced to his (or her) own speaker when there is no impedance matching in the hybrid converter 16 that provides a transition from two lines to four lines in a conventional telephone. Thus, if the echo and side tones are not properly eliminated during hands-free communication through a conventional telephone, the voice of one party is often mixed with that of the other party, degrading the communication quality. Hence, the conventional telephone should be provided with an additional circuit for eliminating such echo and side tones, although this concomitantly increases the production and unit cost of the telephone.

Figure 2:
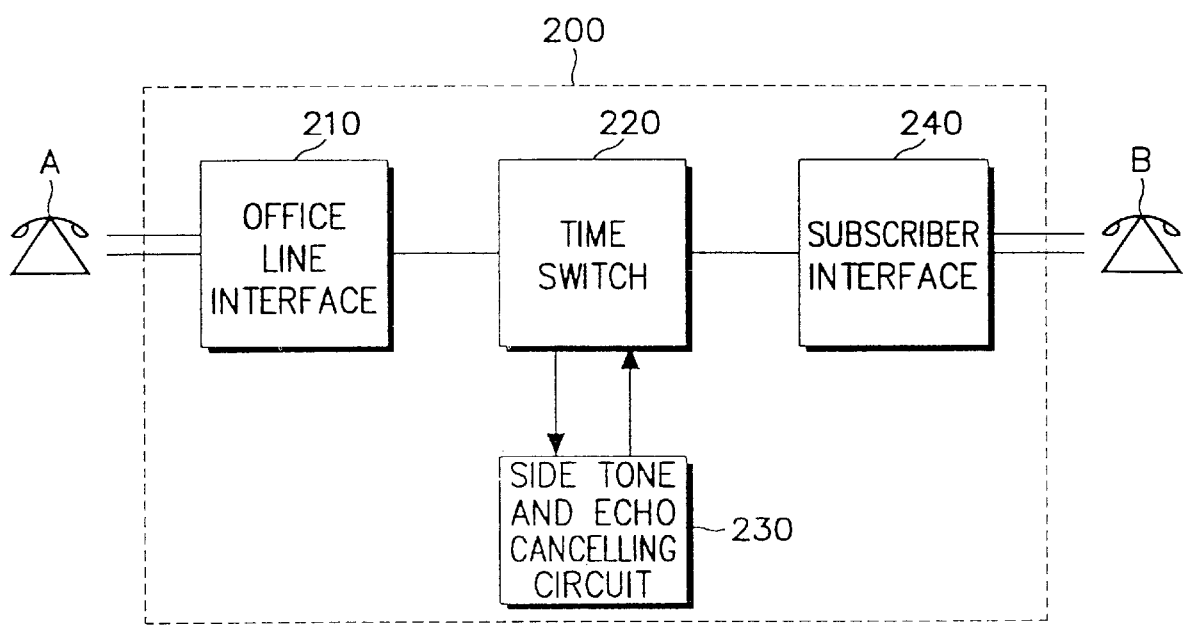
FIG. 2 is a block diagram for illustrating a switching system according to the present invention.

Referring to FIG. 2, a switching system may be constructed with an office line interface 210, time switch 220, echo and side tone canceling circuit 230, and subscriber interface 240. The office line interface 210 interfaces the office line with the time switch 220. The time switch 220 switches the data flowing between the office line interface 210 and the subscriber interface 240. The side tone and echo canceling circuit 230 eliminates the side tones and echo from the pulse code modulated (i.e., "PCM") data received from the time switch 220, and then write the PCM data rid of the side tone and echo into the time switch 220. The subscriber interface 240 interfaces the time switch 220 with the subscriber.

Describing the communication between two telephones "A" and "B" respectively connected through the office line interface 210 and the subscriber interface 240 with the switching system, in connection with FIG. 2, the office line interface 210 converts a voice signal received from the first telephone "A" into corresponding PCM data and the PCM data is then transferred to the time switch 220, which in turn transfers the PCM data to the side tone and echo canceling circuit 230. The side tone and echo canceling circuit 230 eliminates the side tones and echo from the PCM data, and then writes the PCM data rid of them into the time switch 220, which in turn transfers it to the subscriber interface 240. Thus, the subscriber interface 240 converts the PCM data back to a voice signal, thereby transferring the voice signal of the first telephone "A" to the second telephone "B".

Likewise, the subscriber interface 240 converts a voice signal received from the second telephone "B" into corresponding PCM data transferred to the time switch 220, which in turn transfers it to the side tone and echo canceling circuit 230. The side tone and echo canceling circuit 230 eliminates the side tones and echo from the PCM data, and then writes the PCM data rid of the side tone and echo into the time switch 220. Thus, the office line interface 210 converts the PCM data back to a voice signal, thereby transferring the voice signal of the first telephone "B" to the second telephone "A".

Figure 3:
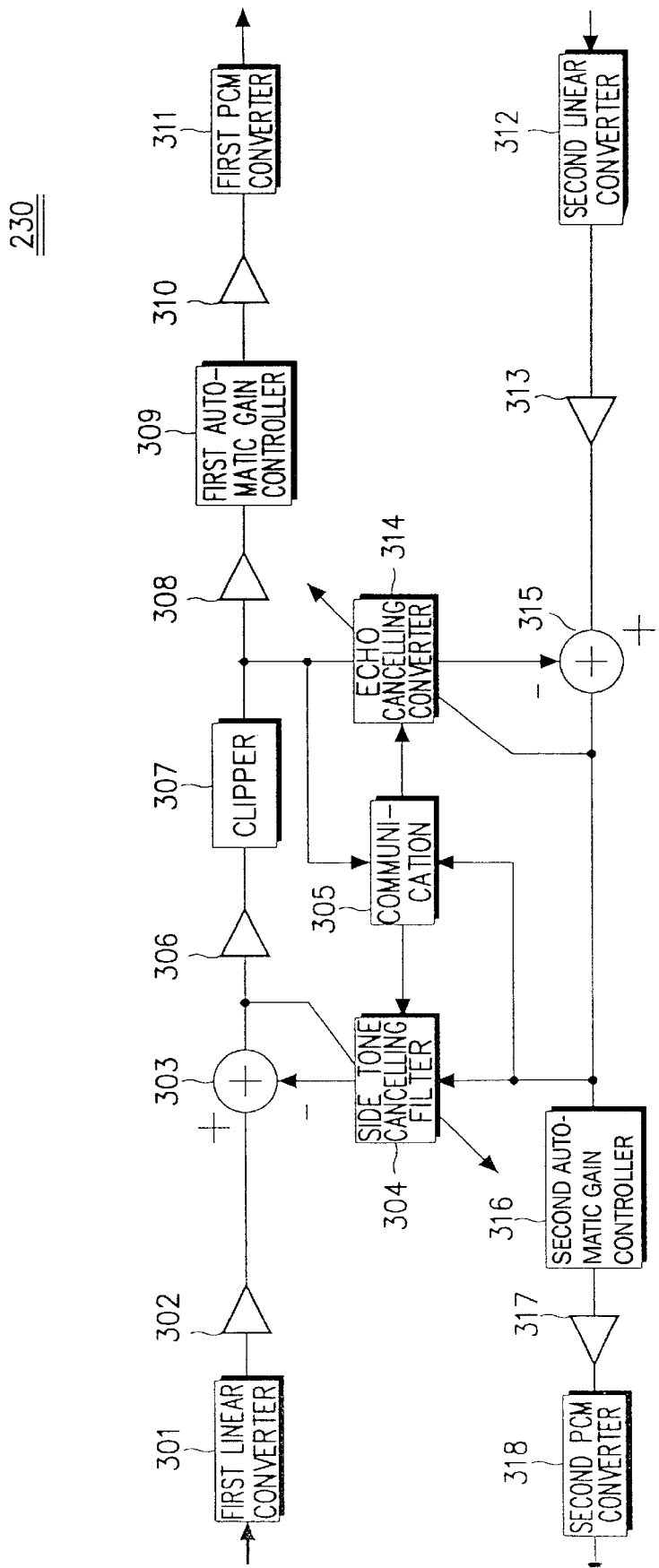
FIG. 3 is a schematic circuit diagram for illustrating a circuit for eliminating the echo and side tones from a voice signal in a switching system according to the present invention.

The operation of the side tones and echo canceling circuit 230 will now be described in connection with FIGS. 2 and 3. A first linear converter 301 linearly converts the PCM data received by the time switch 220 through the office line interface 210 from the first telephone "A" into an analog signal. The analog signal output of the first linear converter 301 is amplified by a first amplifier 302 and transferred to an adder (i.e., a summing circuit) 303, which eliminates the side tones from the output of the first amplifier 302 by means of a side tone canceling filter 304. The side tone canceling filter 304 preferably consists of an adaptive filter, continuously extracting the side tones induced into the first linear converter 301 until an acceptable communication state has been established between the two telephones. Thus, the side tone canceling filter 304 provides the values of the side tones to the adder 303 under the control of a communication state detector 305. Hence, the adder 303 subtracts the values of the side tones, provided by side tone canceling filter 304, from the output signal of the first amplifier 302, generating the resultant signal to a second amplifier 306.

The communication state detector 305 detects the state of the communication between the telephones "A" and "B" to control the side tone canceling filter 304 and an echo canceling filter 314. Namely, detecting the voice data received from the telephone "A", the communication state detector 305 controls the side tone canceling filter 304 so as to eliminate the side tones from the output signal of the first amplifier 302.

The second amplifier 306 amplifies the output of the adder 303 and transfers the amplified signal to a clipper 307. Clipper 307 clips the signal greater than a given value and transfers the signal to a third amplifier 308. The third amplifier 308 amplifies the output signal of the clipper 307. A first automatic gain controller 309 automatically controls the gain of the output signal of the third amplifier 308 and transfers the gain controlled signal to a fourth amplifier 310. The fourth amplifier 310 amplifies the gain controlled signal output from the first automatic gain controller 309 and transfers the signal to a first PCM converter 311. PCM converter 311 converts the output signal from amplifier 310 into corresponding PCM data which is then written into the time switch 220 in the write message mode of the time switch 220. Thus, the side tones are eliminated from the voice signal of the telephone "A", and time switch 220 sends the resulting modified PCM data through the subscriber interface 240 to the telephone "B".

A second linear converter 312 linearly converts the PCM data received by the time switch 220 through the subscriber interface 240 from the second telephone "B" into an analog signal. The analog signal output of the linear converter 312 is amplified by a fifth amplifier 313 and transferred to an adder 315. Adder 315 eliminates the echo from the output of the amplifier 313 by means of a echo canceling filter 314. The echo canceling filter 314 preferably consists of an adaptive filter, continuously extracting the echo induced into the second linear converter 312 until an acceptable communication state has been established between the two telephones. Thus, the echo canceling filter 314 provides the values of the echo to the adder 315 under the control of the communication state detector 305. Hence, the adder 315 subtracts the values of the echo, provided by echo canceling filter 314, from the output signal of the fifth amplifier 313. The resultant signal output from adder 315 is sent to a second automatic gain controller 316. The second automatic gain controller 316 automatically controls the gain of the output signal of the adder 315 and transfers the gain controlled signal to a sixth amplifier 317. The sixth amplifier 317 amplifies the gain controlled signal output of the second automatic gain controller 316 and transfers the signal to the second PCM converter 318, which converts it into corresponding PCM data which is then written into the time switch 220. Thus, echo is eliminated from the voice signal of the telephone "B", and the time switch 220 sends the modified PCM da ta through the office line interface 210 to the telephone "A".

Thus, the invention provides a switching system with a circuit for eliminating the side tones and echo from the voice signals exchanged between two telephones so that there is no need to provide each telephone with a separate circuit for eliminating the side tones and echo. While the present invention has been described with specific embodiments accompanied by the attached drawings, it will be appreciated by those skilled in the art that various changes and modifications may be made thereto without departing the gist of the present invention.

What is claimed is:

1. A circuit for attenuating echo and side tones in a switching system connecting first and second subscribers, comprising:

a first linear converter for converting pulse code modulation data generated by said first subscriber into an analog signal;

a side tone canceling filter for eliminating the side tones from the analog signal produced by said first linear converter;

a clipper for clipping said analog signal rid of said side tones to prevent an amplitude value of said analog signal rid of said side tones from being greater than a predetermined value;

a first pulse code modulation converter connected to an output of said clipper for converting the analog signal rid of said side tones passed by said clipper into a refined pulse code modulation data;

a second linear converter for converting pulse code modulation data generated by said second subscriber into an analog signal;

an echo canceling filter for eliminating the echo from the analog signal produced by said second linear converter;

a second pulse code modulation converter for converting the analog signal rid of said echo into a second refined pulse code modulation data; and a communication state detector for detecting the state of the communication between the first and second subscribers so as to control said side tone canceling filter and said echo canceling filter.

2. A circuit as defined in claim 1, wherein said side tone canceling filter comprises an adder and an adaptive filter, said adaptive filter being controlled by said communication state detector to provide side tone values to said adder based on said state of the communication between the first and second subscribers, said adder subtracting said side tone values from said analog signal output from said first linear converter to produce said analog signal rid of said side tones.

3. A circuit as defined in claim 1, wherein said echo canceling filter comprises an adder and an adaptive filter, said adaptive filter being controlled by said communication state detector to provide echo values to said adder based on said state of the communication between the first and second subscribers, said adder subtracting said echo values from said analog signal output from said second linear converter.

4. A circuit as defined in claim 1, further comprising an automatic gain controller coupled between said clipper and said first pulse code modulation converter for controlling the gain of said analog signal rid of said side tones prior to said analog signal rid of said side tones being converted by said first pulse code modulation converter.

5. A circuit as defined in claim 1, further comprising an automatic gain controller for controlling the gain of said analog signal rid of said echo prior to said analog signal rid of said echo being converted by said second pulse code modulation converter.

6. A circuit as defined in claim 1, further comprising said communication state detector being connected to an output of said clipper for detecting the state of the communication between the first and second subscribers so as to control said side tone canceling filter.

7. A circuit as defined in claim 6, wherein said echo canceling filter comprises a second adder and a second adaptive filter, said second adaptive filter being controlled by said communication state detector to provide echo values to said second adder based on said state of the communication between the first and second subscribers, said second adder subtracting said echo values from said analog signal output from said second linear converter.

8. A circuit as defined in claim 7, further comprising said communication state detector being connected to an output of said second adder for detecting the state of the communication between the first and second subscribers so as to control said echo canceling filter.

9. A circuit as defined in claim 2, further comprising an automatic gain controller for controlling the gain of said analog signal rid of said side tones prior to said analog signal rid of said side tones being converted by said first pulse code modulation converter.

10. A circuit as defined in claim 7, further comprising an automatic gain controller for controlling the gain of said analog signal rid of said echo prior to said analog signal rid of said echo being converted by said second pulse code modulation converter.

11. A circuit for attenuating side tones in a first communication path and echo in a second communication path connecting first and second subscribers in a switching system, comprising:

a first linear converter disposed in said first communication path, said first linear converter converting pulse code modulation data generated by said first subscriber into a first analog signal;

side tone canceling means connected to an output of said first linear converter, said side tone canceling means eliminating the side tones from said first analog signal to produce a modified first analog signal;

a first automatic gain controller controlling the gain of said modified first analog signal to produce a gain controlled first analog signal;

a first pulse code modulation converter connected to an output of said first automatic gain controller, said first pulse code modulation converter converting the gain controlled first analog signal into a first refined pulse code modulation data;

a second linear converter disposed in said second communication path, said second linear converter converting pulse code modulation data generated by said second subscriber into a second analog signal;

echo canceling means connected to an output of said second linear converter, said echo canceling means eliminating the echo from said second analog signal to produce a modified second analog signal;

a second automatic gain controller controlling the gain of said modified second analog signal to produce a gain controlled second analog signal;

a second pulse code modulation converter connected to an output of said second automatic gain controller, said second pulse code modulation converter converting the gain controlled second analog signal into a second refined pulse code modulation data; and a communication state detector connected between said first and second communication paths, said communication state detector detecting a communication state in said first communication path and a communication state in said second communication path so as to control said side tone canceling means and said echo canceling means, respectively.

12. A circuit as defined in claim 11, wherein said side tone canceling means comprises an adder and an adaptive filter, said adaptive filter being controlled by said communication state detector to provide side tone values to said adder based on said communication state in said first communication path, said adder subtracting said side tone values from said first analog signal output from said first linear converter.

13. A circuit as defined in claim 11, wherein said echo canceling means comprises an adder and an adaptive filter, said adaptive filter being controlled by said communication state detector to provide echo values to said adder based on said communication state in said second communication path, said adder subtracting said echo values from said second analog signal output from said second linear converter.

14. A circuit as defined in claim 12, wherein said echo canceling means comprises a second adder and a second adaptive filter, said second adaptive filter being controlled by said communication state detector to provide echo values to said second adder based on said communication state in said second communication path, said second adder subtracting said echo values from said second analog signal output from said second linear converter.

15. A circuit as defined in claim 11, further comprising a clipper connected between said side tone canceling means and said first automatic gain controller, said clipper clipping said modified first analog signal to prevent an amplitude value of said modified first analog signal from being greater than a predetermined value.

16. A circuit as defined in claim 12, further comprising a clipper connected between said adder and said first automatic gain controller, said clipper clipping said modified first analog signal to prevent an amplitude value of said modified first analog signal from being greater than a predetermined value.

17. A circuit for attenuating echo and sidetone in a switching system connecting first and second subscribers, comprising:

a first linear converter for converting first pulse code modulation data generated by one of said first and second subscribers into a first analog signal;

a first adder having first and second inputs, said first input being connected to receive said first analog signal;

a first adaptive filter for providing sidetone values or echo values to said second input of said first adder, said first adder eliminating one of said sidetone or said echo from said first analog signal in response to said sidetone values or said echo values, respectively, to produce a modified first analog signal;

a first pulse code modulation converter connected to an output of said first adder for converting the modified first analog signal into a first refined pulse code modulation data;

a second linear converter for converting second pulse code modulation data generated by the other one of said first and second subscribers into a second analog signal;

a second adder having first and second inputs, said first input being connected to receive said second analog signal;

a second adaptive filter for providing sidetone values or echo values to said second input of said second adder, said second adder eliminating one of said sidetone or said echo from said second analog signal in response to said sidetone values or said echo values, respectively, to produce a modified second analog signal;

a second pulse code modulation converter connected to an output of said second adder for converting the modified second analog signal into a second refined pulse code modulation data; and a communication state detector for detecting a communication state between the first and second subscribers so as to control said first and second adaptive filters.

18. The circuit as set forth in claim 17, said first adaptive filter being controlled by said communication state detector to provide said sidetone values to said second input of said first adder based on said communication state between the first and second subscribers, said first adder subtracting said sidetone values from said first analog signal output from said first linear converter.

19. The circuit as set forth in claim 17, said second adaptive filter being controlled by said communication state detector to provide said echo values to said second input of said second adder based on said communication state between the first and second subscribers, said second adder subtracting said echo values from said second analog signal output from said second linear converter.

20. The circuit as set forth in claim 17, further comprising:

a clipper for clipping an amplitude value of the one of said first or second said analog signals having said sidetone eliminated therefrom when said amplitude value is greater than a predetermined value; and an automatic gain controller for controlling the gain of the signal output by said clipper to provide a gain controlled analog signal to one of said first and second pulse code modulation converters.

* * * * *